US012706793B2

(12) United States Patent
Ma et al.

(10) Patent No.: US 12,706,793 B2
(45) Date of Patent: Aug. 11, 2026

(54) GENERATION, CONFIGURATION AND TRANSMISSION OF A CHIRPLIKE SIGNAL

(71) Applicant: ZTE Corporation, Shenzhen (CN)

(72) Inventors: Yihua Ma, Shenzhen (CN); Zhifeng Yuan, Shenzhen (CN); Shuqiang Xia, Shenzhen (CN); Guanghui Yu, Shenzhen (CN); Liujun Hu, Shenzhen (CN); Chuangxin Jiang, Shenzhen (CN); Zhiqiang Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 18/991,125

(22) Filed: Dec. 20, 2024

(65) Prior Publication Data

US 2025/0202750 A1 Jun. 19, 2025

Related U.S. Application Data

(63) Continuation of application No. PCT/CN2022/139417, filed on Dec. 15, 2022.

(51) Int. Cl.
*H04L 27/26* (2006.01)

(52) U.S. Cl.
CPC ................................ *H04L 27/2613* (2013.01)

(58) Field of Classification Search
CPC .................................................. H04L 27/2613
See application file for complete search history.

(56) References Cited

U.S. PATENT DOCUMENTS

| | | | |
|---|---|---|---|
| 2016/0061947 A1 | 3/2016 | Patole et al. | |
| 2022/0091251 A1 | 3/2022 | Heller | |
| 2022/0131723 A1* | 4/2022 | Bayesteh | ............ H04L 25/0204 |

FOREIGN PATENT DOCUMENTS

| | | |
|---|---|---|
| CN | 112134821 A | 12/2020 |
| CN | 114826323 A | 7/2022 |
| WO | 2020/023248 A1 | 1/2020 |

OTHER PUBLICATIONS

ISA, International Search Report and Written Opinion for International Application No. PCT/CN2022/139417, mailed on Aug. 17, 2023, 6 pages.

EPO, Extended European Search Report for European Application No. 22 968 211.7, mailed on Jul. 15, 2025, 10 pages.

Steeg, M. et al., "OFDM joint communication-radar with leaky-wave antennas," Electronics Letters, the Institution of Engineering and Technology, GB, vol. 56, No. 21, Oct. 2020, 1139-1141.

* cited by examiner

*Primary Examiner* — Rahel Guarino

(74) *Attorney, Agent, or Firm* — Ashurst Perkins Coie US LLP

(57) ABSTRACT

This patent application discloses methods, apparatus, and systems that relate generating, configuring, and transmitting a chirplike signal in communication systems. In one example aspect, a method for wireless communication includes transmitting, by a first wireless device, a sensing signal with frequency as a continuous function of time over a period of time in a range of [−B/2, B/2], wherein B is a transmission bandwidth of the sensing signal.

20 Claims, 10 Drawing Sheets

1000

1002

Receiving, by a second wireless device , a sensing signal with frequency as a continuous function of time over a period of time in a range of [-$B$/2, $B$/2], wherein $B$ is a transmission bandwidth of the sensing signal.

1004

Conducting an operation based on the sensing signal.

A BS generates a sensing signal whose frequency is linearly and continuously swept in the range of [-B/2, B/2]

The BS transmits the generated signal.

$\exp(j\varphi(t))$ linearly sweeps the frequency

⇕

$\varphi'(t) = d\varphi(t)/dt = at+b$ is a linear function

⇕

$\varphi''(t) = d^2\varphi(t)/dt^2 = C$ is a constant

Continuous Sweeping in [-B/2, B/2]

f
B/2
0
-B/2
t f
B/2
0
-B/2
-T/2
T/2
T
t
shift to right by T/2
time shift

Transmitting, by a first wireless device, a sensing signal with frequency as a continuous function of time over a period of time in a range of $[-B/2, B/2]$, wherein $B$ is a transmission bandwidth of the sensing signal.

GENERATION, CONFIGURATION AND TRANSMISSION OF A CHIRPLIKE SIGNAL

CROSS-REFERENCE TO RELATED APPLICATION

This application is a continuation and claims priority to International Application No. PCT/CN2022/139417, filed on Dec. 15, 2022, the disclosure of which is hereby incorporated by reference herein in its entirety.

TECHNICAL FIELD

This patent document is related to wireless communications.

BACKGROUND

Mobile telecommunication technologies are moving the world toward an increasingly connected and networked society. In comparison with the existing wireless networks, next generation systems and communication techniques will need to support a much wider range of use-case characteristics and provide a more complex and sophisticated range of access requirements and flexibilities.

SUMMARY

This patent document discloses techniques, among other things, related to generation, configuration and transmission of a chirplink signal, which can be used in a wireless communication system.

In one example aspect, wireless communication method is disclosed. The method includes transmitting, by a first wireless device, a sensing signal with frequency as a continuous function of time over a period of time in a range of [−B/2, B/2], wherein B is a transmission bandwidth of the sensing signal.

In yet another example aspect, a wireless communication device comprising a process that is configured or operable to perform the above-described methods is disclosed.

In yet another example aspect, a computer readable storage medium is disclosed. The computer-readable storage medium stores code that, upon execution by a processor, causes the processor to implement an above-described method.

These, and other, aspects are further described throughout the present document.

DETAILED DESCRIPTION

Figure 1:
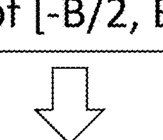
FIG. 1 shows an example diagram of explanation of frequency of linearly and continuously swept in a frequency range.
Figure 1:
Figure 1:
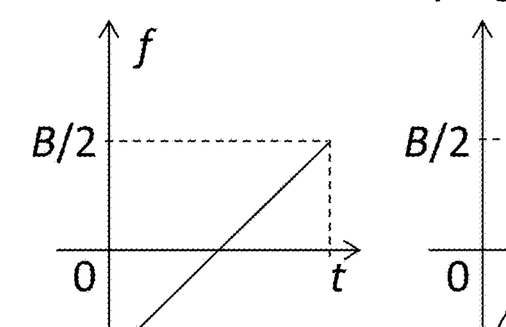

Headings for the various sections below are used to facilitate the understanding of the disclosed subject matter and do not limit the scope of the claimed subject matter in any way. Accordingly, one or more features of one section can be combined with one or more features of another section. Furthermore, 6G or integrated sensing and communications (ISAC) terminology is used for clarity of explanation. Still, the techniques disclosed in the present document are not limited to 6G or ISAC technology only and may be used in wireless systems that implement other protocols.

ISAC is expected to add considerable value to the wireless communication system. The widely deployed communication infrastructures can be enhanced to provide radar services like traffic control and surveillance, drone detection, and railway obstacle detection. The various mobile communication devices in the scenarios of autonomous driving, smart home, and health care can also realize ISAC.

The communication system and radar system utilize electromagnetic waves in two different ways. The idea of dual-function design can be traced back to the 1960s. It has attracted more and more research attention in recent years, and there are many driving factors, including (1) the spectrum has been well exploited for two separate systems, and the joint spectrum utilization is expected to improve the efficiency and flexibility; (2) the hardware designs both have a technology trend of multiple antennas and digital baseband, and the share of hardware saves the cost; (3) the information fusion and mutual reinforcement of two functions bring performance gain, especially for autonomous vehicles.

One existing problem in communication infrastructure related to sensing is the self-interference (SI) problem. For radar systems, this problem can be easily solved via using linear frequency modulation (LFM) signal. The received LFM is dechirped, or mixed, with the transmitted LFM signal, which conveys the strong SI into direct currency (DC) signal. The DC signal can be easily filtered, and thus SI is canceled. Communication device can transmit Zadoff-Chu (ZC) sequence, which is similar to LFM signal. However, the dechirp processing of ZC sequence does not performance well as the frequency is not continuously sweeped. Even using OFDM hardware to generate a standard LFM signal, the problem still occurs.

In ISAC, the communication hardware is expected to generate sensing signals. A common sensing signal is LFM signal expressed as:

$$x(t) = \exp\left(j\pi\frac{B}{T}t^2\right),\ 0 \le t \le T,$$

where B and T are the bandwidth and time interval of a LFM signal, respectively.

The LFM signal is usually generated by the analog methods using a voltage-controlled oscillator (VCO), or surface acoustic wave (SAW) devices.

If it is generated by the OFDM digital hardware, it needs to go through a discretized process, where the continuous time t is replaced with $$\frac{m}{M}T,$$

and the discretized time gap TIM is the reciprocal of bandwidth B, which can be expressed as $$s(m)=\exp\left(j\pi BT\left(\frac{m}{M}\right)^2\right)=\exp\left(j\pi\frac{m^2}{M}\right),\ m=0,1,2,\ldots,M-1.$$

Although the discretized signal is a zero-autocorrelation sequence, it cannot work well with the dechirp processing as the frequency is swept from 0 to B/2, and then aliased to the negative frequencies swept from −B/2 to 0. The aliasing problem leads to wrong values at the non-integer points, as the correct values require a bandwidth of [0, B]. Similar problems can be found when Zadoff-Chu (ZC) sequence is used.

This patent application proposes methods and schemes to solve, among other things, the above problem. The proposed methods and schemes are beneficial in removing the discontinuity in an original signal and avoid the aliasing problem during the discretizing process for ZC and other sequences.

The details of the proposed methods will be discussed in the following embodiments.

Embodiment 1

This section discloses, among other things, introduction of 'linearly' and 'continuously' signals.

Linearly

A linear frequency sweeping means the first-order derivative of the phase information φ(t), φ'(t), is a linear function of t.

Accordingly, the second-order derivative of the phase information φ(t), φ"(t), is a constant.

As shown in FIG. 1, a BS generates a sensing signal whose frequency is linearly swept in the range of [−B/2, B/2].

In the example as shown FIG. 1, exp(jφ(t)) linearly sweeps the frequency, which generates φ'(t)=dφ(t)/dt=at+b as a linear function, and φ"(t)=d2φ(t)/dt2=C as a constant.

Continuously

A continuous-time form signal has the benefit of easily being converted into discrete form.

Here, the "continuously" can be defined with respect to a frequency domain.

A continuous frequency sweeping in [−B/2, B/2] means with a sampling rate or bandwidth of B, all frequency is aliased into [−B/2, B/2], and the sweeping in this range is continuous.

As shown in FIG. 1, a BS generates a sensing signal whose frequency is continuously swept in the range of [−B/2, B/2].

The top right portion of FIG. 1 discloses an example of discontinuous sweeping in [B/2, B/2]. Here, the horizontal axe represents the time domain, and the vertical axe represents the frequency domain. The sweeping from 0 to B is not continuous since it is aliased into [−B/2, B/2].

The bottom right portion of FIG. 1 discloses an example of discontinuous sweeping in [B/2, B/2]. Here, the horizontal axe represents the time domain, and the vertical axe represents the frequency domain. A frequency sweeping from [−B/2, B/2] is continuous, which can be linear or nonlinear.

Embodiment 2

This section discloses, among other things, examples of generating a linear and continuous signal.

For example, a UE may generate the signal through a time shift operation.

In this embodiment, a BS or UE generates the sensing signal via $$s(m)=\exp\left(j\pi\frac{(m-M/2)^2}{M}\right),\ m=0,1,2,\ldots,M-1.$$

or $$s(m)=\exp\left(-j\pi\frac{(m-M/2)^2}{M}\right),\ m=0,1,2,\ldots,M-1.$$

Then, the BS or UE transmits the generated sensing signal. The same node receives the echo of sensing signal and uses the transmitted signal to mix with the received echo signal.

Figure 2:
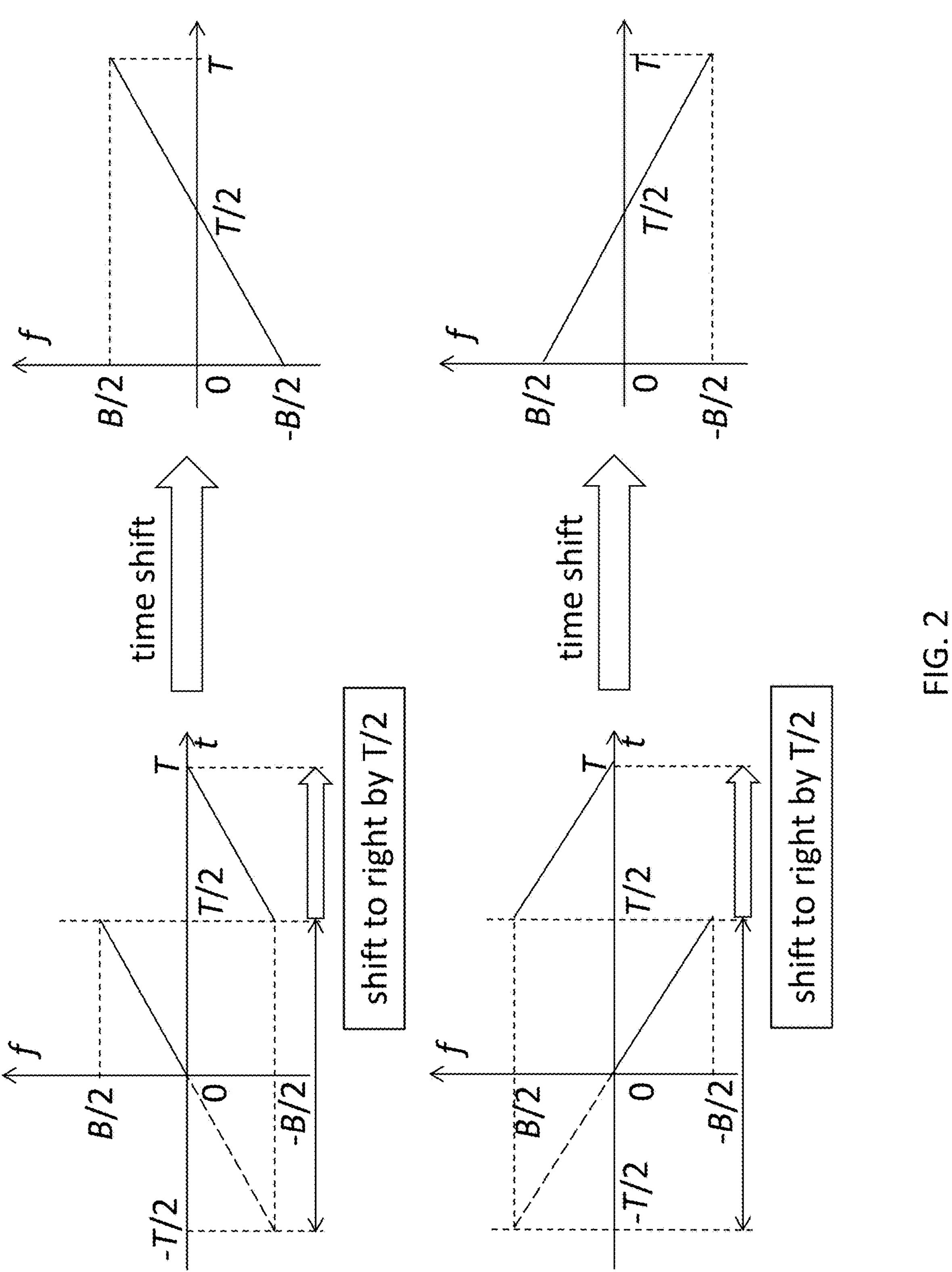
FIGS. 2-4 show example diagrams of generating a linear and continue function through mappings.

As shown in FIG. 2, a similar signal can also be obtained via shifting the time of a signal with expression:

$$s(m)=\exp\left(j\pi\frac{m^2}{M}\right),\ m=0,1,2,\ldots,M-1.$$

or $$s(m)=\exp\left(-j\pi\frac{m^2}{M}\right),\ m=0,1,2,\ldots,M-1.$$

The time shift can be conducted in the following manner. First, a second half signal in time period [−T/2, 0] can be generated using the same formula using m=−M/2, −M/2+1, . . . , −1. Second, the complete signal in time period [−T/2, T/2] can be moved forwardly in time domain with a distance of T/2. In other words, the original signal is shifted from [−T/2, T/2] to [0, T].

In other examples, the time shift offset can be:

$$-\frac{M}{2}+kM,\ -\frac{M-1}{2}+kM,\ \text{or}\ -\frac{M-2}{2}+kM,$$

where k is any integer.

As showing in FIG. 2, the final signal, after the frequency shifting, is continues and linear in both time and frequency domains.

Embodiment 3

This section discloses, among other things, examples of generating a linear and continuous signal.

For example, a UE may generate the signal through a frequency shift operation.

In one example, a BS may generate the sensing signal via the expression $$s(m)=\exp\left(j\pi\frac{m^2}{M}-j\pi m\right),\ m=0,1,2,\ldots,M-1.$$

or $$s(m)=\exp\left(-j\pi\frac{m^2}{M}+j\pi m\right),\ m=0,1,2,\ldots,M-1.$$

Then, the BS transmits the generated sensing signal. Another BS receives the echo of sensing signal at the same resource position and uses the transmitted signal to mix with the received echo signal. The resource position information in the second BS can be obtained from higher layer, e.g., a CN.

Figure 3:
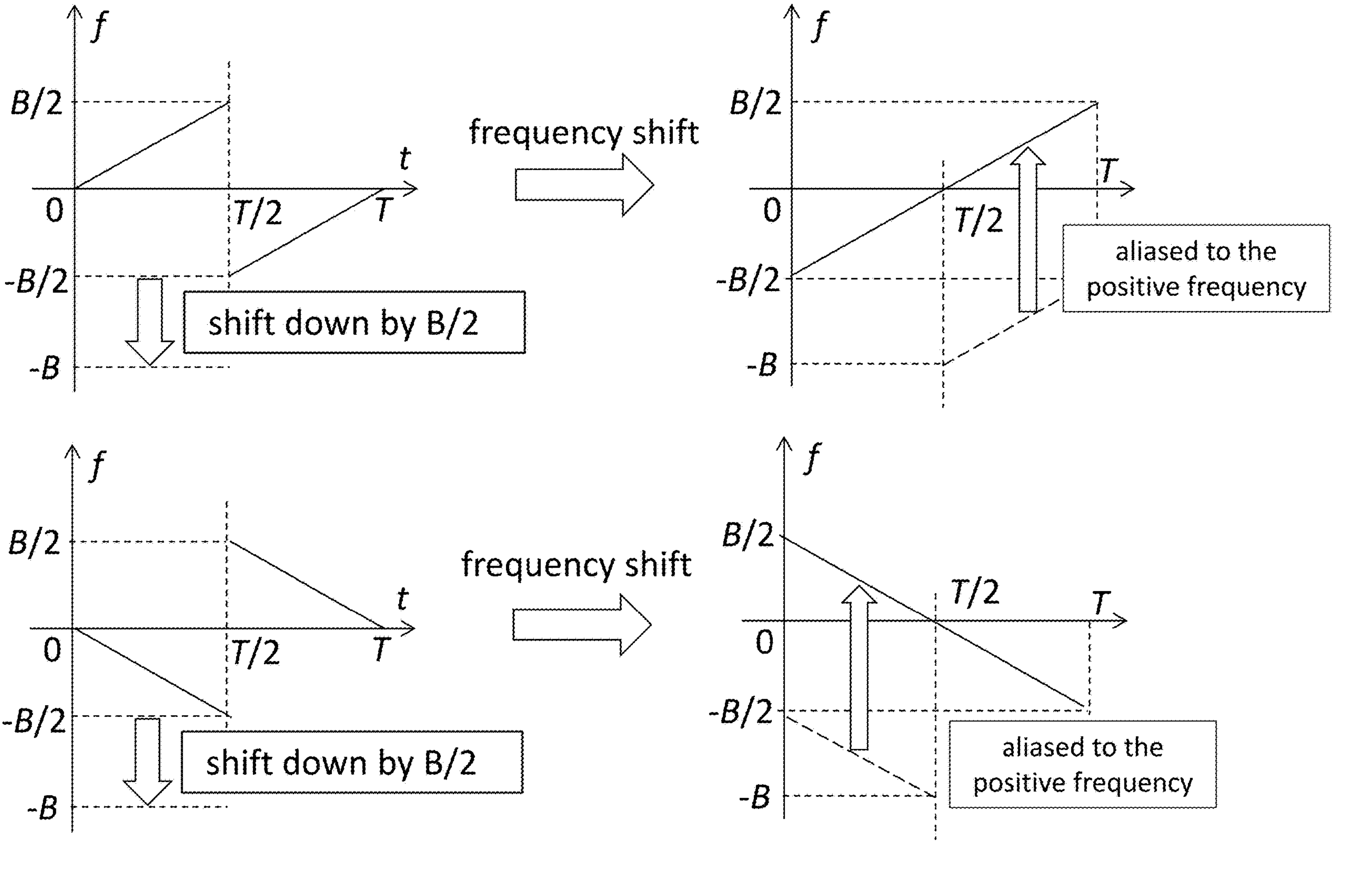

As shown in FIG. 3, a similar signal can also be obtained via shifting the frequency of a signal with expression:

$$s(m)=\exp\left(j\pi\frac{m^2}{M}\right),\ m=0,1,2,\ldots,M-1.$$

or $$s(m)=\exp\left(-j\pi\frac{m^2}{M}\right),\ m=0,1,2,\ldots,M-1.$$

The frequency shift can be conducted in the following manner. First, a first half signal in time period [0, T/2] can be moved downwards in frequency domain with a distance of B/2. In other words, the original signal is shifted to [−B/2, −0] from [0, B/2]. Second, a second half signal in time period [T/2, T] can be moved upwards in frequency domain with a distance of B/2. In other words, the original signal is shifted to [0, B/2] from [B/2, B].

In other examples, the frequency shift offset can be:

$$-\frac{B}{2}+kB,\ -\frac{B-B/M}{2}+kB,\ \frac{B-2B/M}{2}+kB,$$

where k is any integer.

As showing in FIG. 3, the final signal, after the frequency shifting, is continuous and linear in both time and frequency domains.

Embodiment 4

This section discloses, among other things, examples of generating a linear and continuous signal.

For example, a UE may generate the signal through a mapping operation of one of a linear frequency modulation (LFM) signal.

Figure 4:
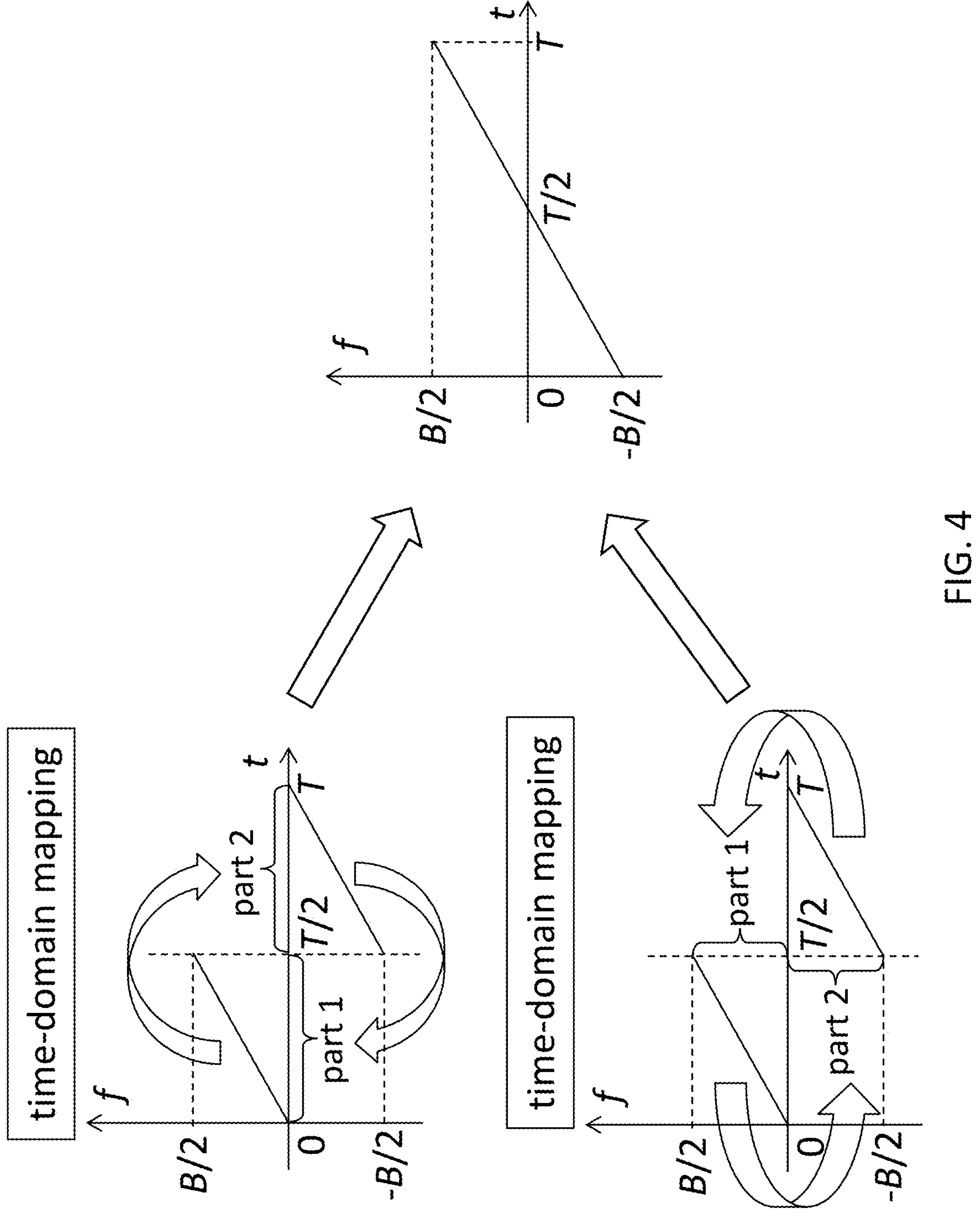

In this embodiment, as shown in FIG. 4, a BS can generate the sensing signal via swapping the first half and the second half of time or frequency domains. The according expression is:

$$s(m)=\exp\left(j\pi\frac{m^2}{M}\right),\ m=0,1,2,\ldots,M-1.$$

After generating a sensing signal using the above method, the UE may transmit the generated sensing signal in the resources allocated by a BS. In a wireless communication environment, some targets may backscatter the sensing signal. The BS receives the echo signal, or the backscattered signal from targets, at the allocated resources. The BS receiver generates a signal using the same method and mix it with the received echo signal. In this way, the self-interference signal that is transmitted directly from the transmit antenna to the receive antenna is transformed to direct-currency signal and the echo signal is transformed to a sum of single-tone signals, where the frequency of the single-tone signal is decided by the target distance. The BS can then obtain the resource position and velocity information of targets through the processing operation.

Embodiment 5

This section discloses, among other things, examples of generating a linear and continuous signal.

For example, a UE may generate the signal through a mapping method related to a Zadoff-Chu sequence.

In this embodiment, a wireless node, e.g., a UE, may generate the sensing signal via setting parameters related to a sequence function. For example, a UE can set the values of u and $C_v$ in equations related to a ZC sequence.

In one example, the value of parameter u is set as u=1 or −1 and the value of $C_v$ is set as $C_v$=−M/2, −(M+1)/2, or −(M−1)/2 of the ZC sequence expressions:

$$x_{u,v}(n)=x_u((n+C_v)\bmod M),$$

$$x_u(m)=e^{-j\frac{\pi um(m+1)}{M}},\ m=0,1,\ldots,M-1.$$

After generating a sensing signal using the above method, the UE may transmit the generated sensing signal in the resources allocated by a BS. In a wireless communication system, some targets may backscatter the sensing signal. The BS receives the echo signal, or the backscattered signal from targets, at the allocated resources. The BS receiver generates a signal using the same method and mix it with the received echo signal. In this way, the self-interference signal which transmits directly from the transmit antenna to the receive antenna is transformed to direct-currency signal and the echo signal is transformed to a sum of single-tone signals, where the frequency of the signal-tone signal is decided by the target distance. The BS can then obtain the resource position and velocity information of targets through the processing operation.

Figure 5:
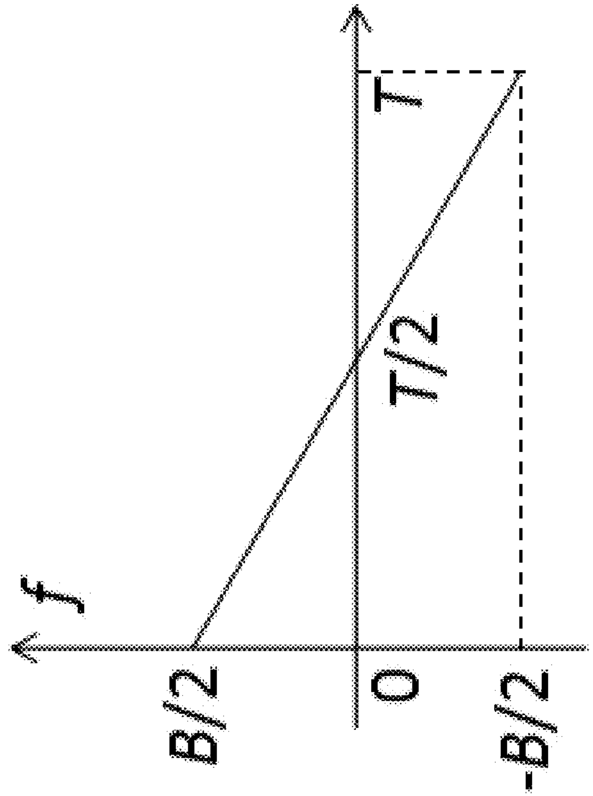
FIG. 5 shows an example of linear and continuous function over [0, T] and [−B/2, B/2] with slope of −1.

FIG. 5 shows the time-frequency map of a case when u=−1, which represent a scenario where the frequency sweeping in the negative direction.

Embodiment 6

This embodiment discloses among other things, examples involving reusing at least part of the sensing signal.

In some examples, at least partial of sensing signal can be reused as a reference signal or a synchronization signal.

Figure 6:
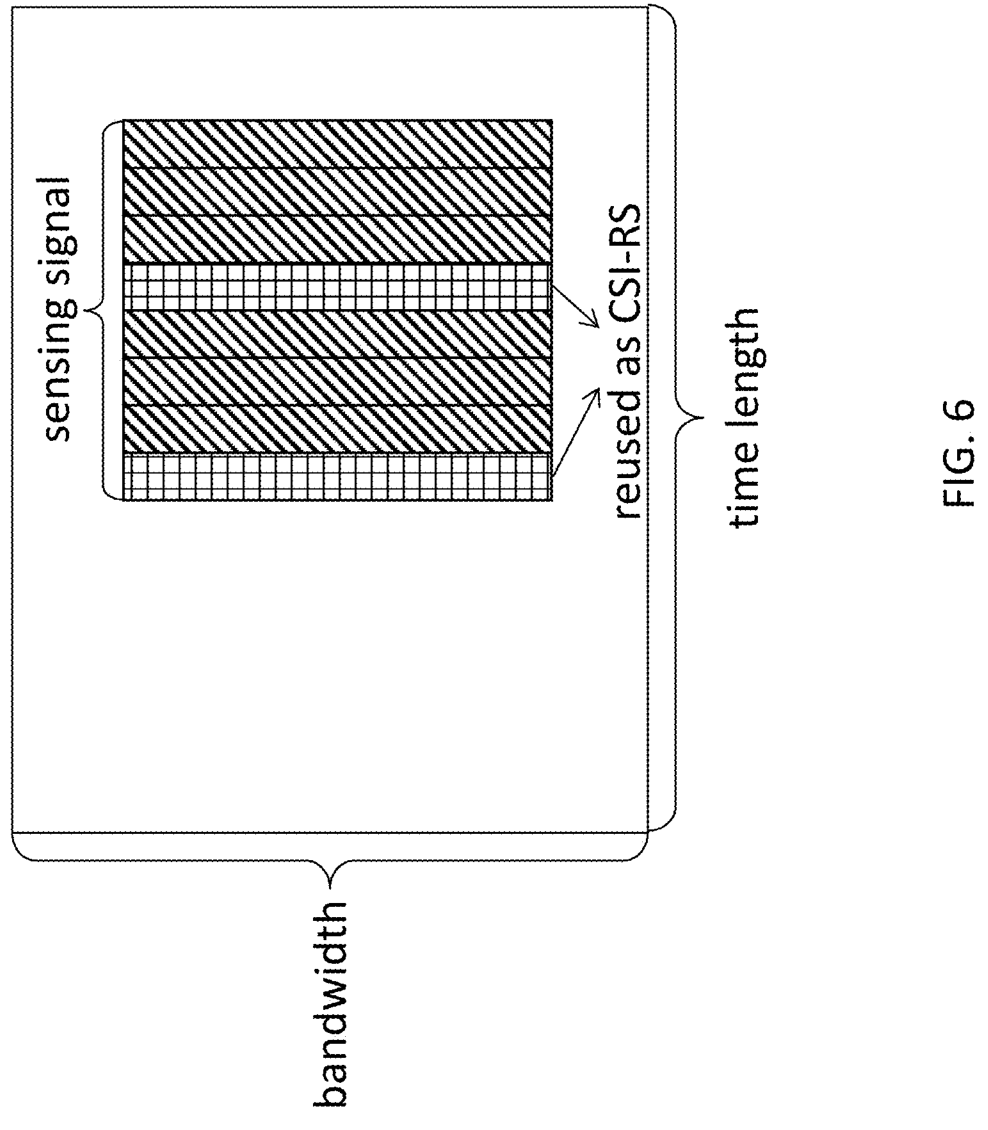
FIG. 6 shows an example of reusing part of sensing signal as the channel state information-reference signal (CSI-RS).

For example, as shown in FIG. 6, the first and the fifth symbol in all 8 symbols of the sensing signal also work as a channel state information reference signal (CSI-RS) to improve the spectrum efficiency.

Figure 7:
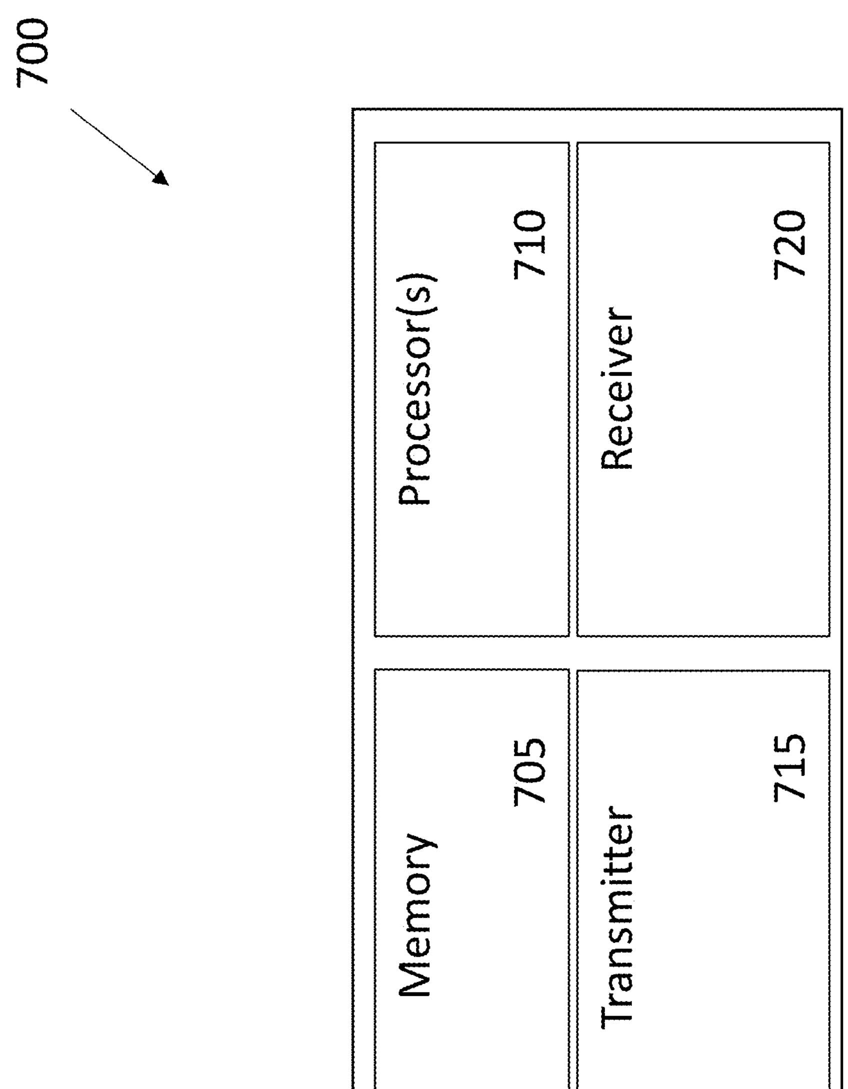
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor

410 configure the hardware platform 700 to perform the operations described in FIGS. 1 to 6 and in the various embodiments described in this patent document. The transmitter 715 transmits or sends information or data to another device. For example, a network device transmitter can send a message to user equipment. The receiver 720 receives information or data transmitted or sent by another device. For example, user equipment can receive a message from a network device.

Figure 8:
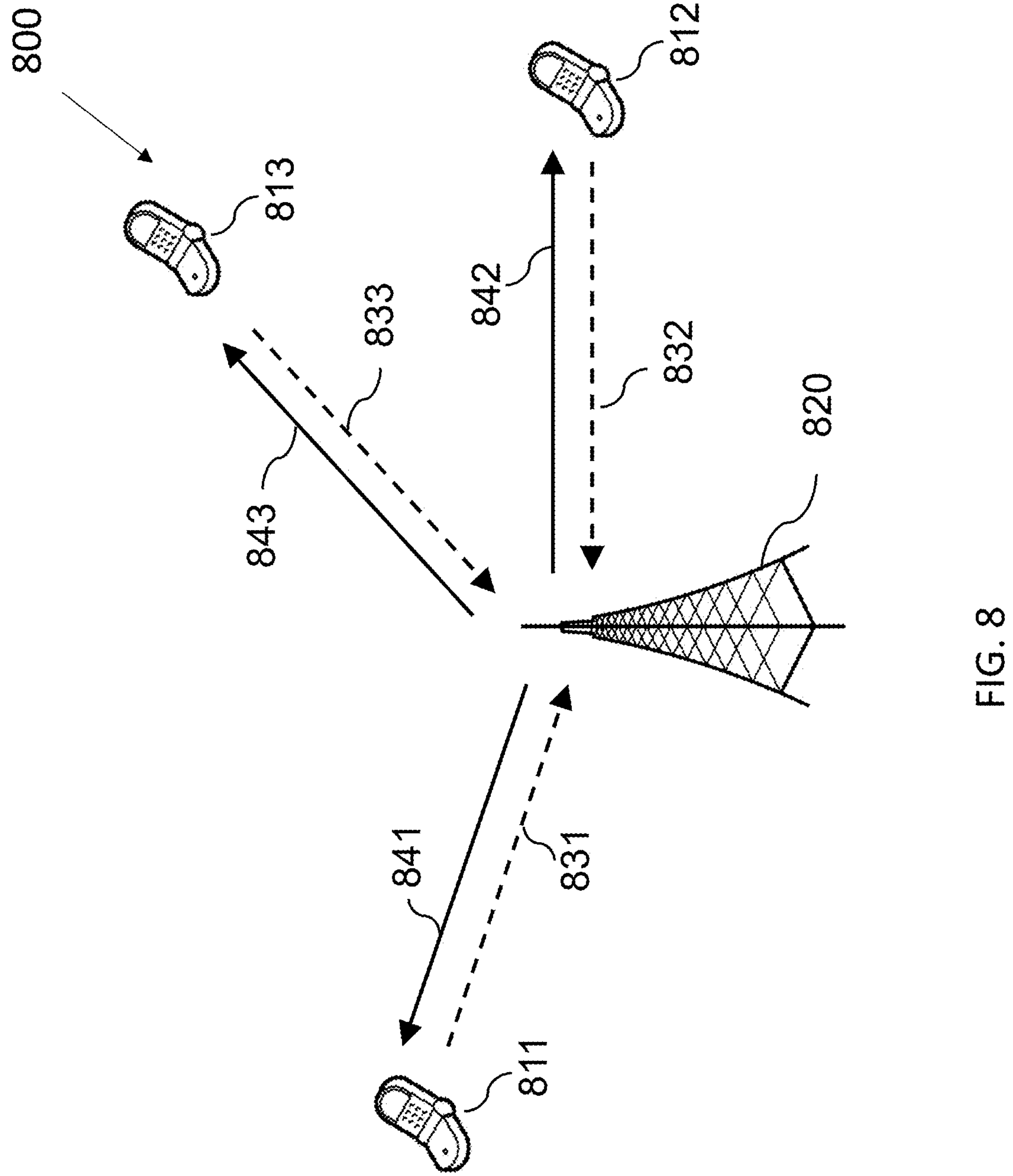
FIG. 8 shows an example of network communication including a base station (BS) and user equipment (UE) based on some implementations of the disclosed technology.

The implementations as discussed above will apply to a network communication. FIG. 8 shows an example of a communication system (e.g., a 6G or NR cellular network) that includes a base station 820 and one or more user equipment (UE) 811, 812 and 813. In some embodiments, the UEs access the BS (e.g., the network) using a communication link to the network (sometimes called uplink direction, as depicted by dashed arrows 831, 832, 833), which then enables subsequent communication (e.g., shown in the direction from the network to the UEs, sometimes called downlink direction, shown by arrows 841, 842, 843) from the BS to the UEs. In some embodiments, the BS send information to the UEs (sometimes called downlink direction, as depicted by arrows 841, 842, 843), which then enables subsequent communication (e.g., shown in the direction from the UEs to the BS, sometimes called uplink direction, shown by dashed arrows 831, 832, 833) from the UEs to the BS. The UE may be, for example, a smartphone, a tablet, a mobile computer, a machine to machine (M2M) device, an Internet of Things (IoT) device, and so on.

Figure 9:
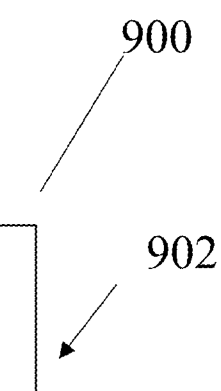
FIGS. 9-10 are flowcharts representation of methods for wireless communication in accordance with one or more embodiments of the present technology.

FIG. 9 shows an example flowchart representation of a method for wireless communication in accordance with one or more embodiments of the present technology. Operation 902 includes transmitting, by a first wireless device, a sensing signal with frequency as a continuous function of time over a period of time in a range of [−B/2, B/2], wherein B is a transmission bandwidth of the sensing signal.

Figure 10:
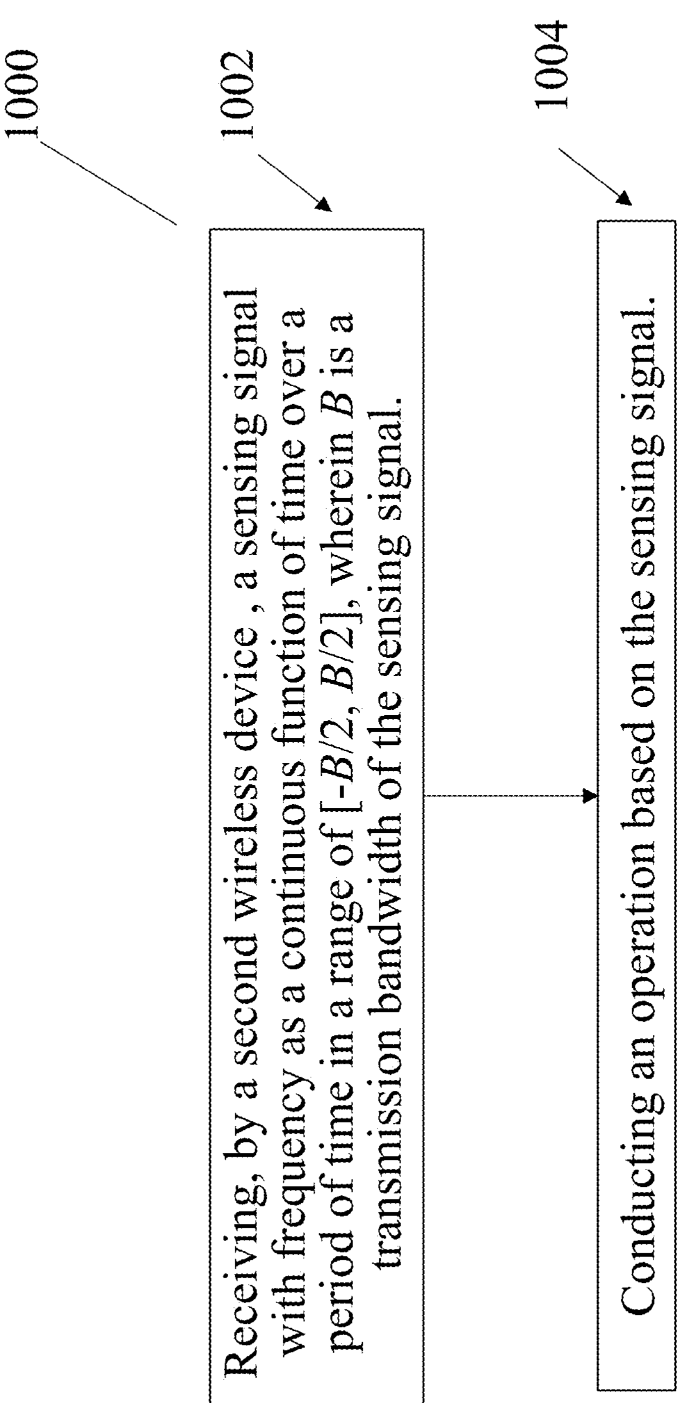

FIG. 10 show an example flowchart representation of a method for wireless communication in accordance with one or more embodiments of the present technology. Operation 1002 includes receiving, by a second wireless device, a sensing signal with frequency as a continuous function of time over a period of time in a range of [−B/2, B/2], wherein B is a transmission bandwidth of the sensing signal. Operation 1004 includes conducting an operation based on the sensing signal.

Various preferred embodiments and additional features of the above-described method of FIGS. 9-10 are as follows. Further examples are described with reference to embodiments 1 to 6.

In one example aspect, a wireless communication method is disclosed. The method includes transmitting, by a first wireless device, a sensing signal with frequency as a continuous function of time over a period of time in a range of [−B/2, B/2], wherein B is a transmission bandwidth of the sensing signal.

In another example aspect, another wireless communication method is disclosed. The method includes receiving, by a second wireless device, a sensing signal with frequency as a continuous function of time over a period of time in a range of [−B/2, B/2], wherein B is a transmission bandwidth of the sensing signal; and conducting an operation based on the sensing signal In some embodiments, the frequency is linearly and continuously swept in the range of [−B/2, B/2].

In some embodiments, the sensing signal is generated by at least one of 1) a time shift operation, 2) a frequency shift operation, 3) a mapping operation of one of a) a linear frequency modulation (LFM) signal, or 4) a mapping method related to a Zadoff-Chu sequence.

In some embodiments, the sensing signal is generated by setting parameters of a Zadoff-Chu (ZC) sequence generation method.

In some embodiments, the sensing signal is generated by setting values of u and $C_v$ of the ZC sequence representing by:

$$x_{u,v}(n) = x_u((n + C_v) \bmod L)$$

$$x_u(i) = e^{-j\frac{\pi u i(i+1)}{L_{RA}}}, \; i = 0, 1, \ldots, L-1$$

In some embodiments, u=1 or −1, wherein $C_v$=−M/2, −(M+1)/2, or −(M−1)/2

In some embodiments, the sensing signal is generated through at least one of:

$$\text{1) } s(m) = \exp\left(j\pi\frac{(m - M/2)^2}{M}\right), \; m = 0, 1, 2, \ldots, M-1, \text{ 2) } s(m) = \exp\left(j\pi\frac{m^2}{M} - j\pi m\right), \; m = 0, 1, 2, \ldots, M-1., \text{ 3) } s(m) = \exp\left(-j\pi\frac{(m - M/2)^2}{M}\right), \; m = 0, 1, 2, \ldots, M-1, \text{ or 4) } s(m) = \exp\left(-j\pi\frac{m^2}{M} + j\pi m\right), \; m = 0, 1, 2, \ldots, M-1.$$

In some embodiments, at least partial of sensing signal is used as a reference signal or a synchronization signal.

It will be appreciated that the present document discloses methods and apparatus related to generating chirplike signal that can be used in ISAC or other communication systems. LFM signal is introduced to solve SI problem. Communication adopts ZC sequence, similar to LFM signal, to achieve the similar goal. The dechirp processing of ZC sequence does not performance well with discretely swept. This patent application proposes methods and schemes to solve the above problem. The proposed methods and schemes are beneficial in removing the discontinuity in an original signal and avoid the aliasing problem during the discretizing process for ZC and other sequences.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method for wireless communication, comprising:

transmitting, by a first wireless device, a sensing signal with a frequency that is a continuous function of time over a period of time in a range of [−B/2, B/2], wherein B is a transmission bandwidth of the sensing signal, wherein the frequency is linearly and continuously swept in the range of [−B/2, B/2].

2. The method of claim 1, wherein the sensing signal is generated by at least one of:

(1) a time shift operation;

(2) a frequency shift operation;

(3) a mapping operation of a linear frequency modulation (LFM) signal; or (4) a mapping method related to a Zadoff-Chu sequence.

3. The method of claim 1, wherein the sensing signal is generated by setting values of u and $C_v$ of a Zadoff-Chu (ZC) sequence, wherein u=1 or −1, wherein $C_v$=−M/2, −(M+1)/2, or −(M−1)/2, the ZC sequence represented by:

$$x_{u,v}(n) = x_u((n + C_v) \bmod M), \text{ and}$$

$$x_u(m) = e^{-j\frac{\pi u m(m+1)}{M}}, \; m = 0, 1, \ldots, M-1.$$

4. The method of claim 1, wherein the sensing signal is generated using at least one of:

$$s(m) = \exp\left(j\pi\frac{(m - M/2)^2}{M}\right), \; m = 0, 1, 2, \ldots, M-1; \quad (1)$$

$$s(m) = \exp\left(j\pi\frac{m^2}{M} - j\pi m\right), \; m = 0, 1, 2, \ldots, M-1; \quad (2)$$

$$s(m) = \exp\left(-j\pi\frac{(m - M/2)^2}{M}\right), \; m = 0, 1, 2, \ldots, M-1; \text{ or} \quad (3)$$

$$s(m) = \exp\left(-j\pi\frac{m^2}{M} + j\pi m\right), \; m = 0, 1, 2, \ldots, M-1. \quad (4)$$

5. The method of claim 1, wherein at least a part of the sensing signal is used as a reference signal or a synchronization signal.

6. A method for wireless communication, comprising:

receiving, by a second wireless device, a sensing signal with a frequency that is a continuous function of time over a period of time in a range of [−B/2, B/2], wherein B is a transmission bandwidth of the sensing signal, wherein the frequency is linearly and continuously swept in the range of [−B/2, B/2]; and conducting an operation based on the sensing signal.

7. The method of claim 6, wherein the sensing signal is generated by at least one of:

(1) a time shift operation, (2) a frequency shift operation, (3) a mapping operation of a linear frequency modulation (LFM) signal, or (4) a mapping method related to a Zadoff-Chu sequence.

8. The method of claim 6, wherein the sensing signal is generated by setting values of u and $C_v$ of a Zadoff-Chu (ZC) sequence, wherein u=1 or −1, wherein $C_v$=−M/2, −(M+1)/2, or −(M−1)/2, the ZC sequence represented by:

$$x_{u,v}(n) = x_u((n + C_v) \bmod M), \text{ and}$$

$$x_u(m) = e^{-j\frac{\pi u m(m+1)}{M}}, \; m = 0, 1, \ldots, M-1.$$

9. The method of claim 6, wherein the sensing signal is generated using at least one of:

$$s(m) = \exp\left(j\pi\frac{(m - M/2)^2}{M}\right), \; m = 0, 1, 2, \ldots, M-1; \quad (1)$$

$$s(m) = \exp\left(j\pi\frac{m^2}{M} - j\pi m\right), \; m = 0, 1, 2, \ldots, M-1; \quad (2)$$

$$s(m) = \exp\left(-j\pi\frac{(m - M/2)^2}{M}\right), \; m = 0, 1, 2, \ldots, M-1; \text{ or} \quad (3)$$

$$s(m) = \exp\left(-j\pi\frac{m^2}{M} + j\pi m\right), \; m = 0, 1, 2, \ldots, M-1. \quad (4)$$

10. The method of claim 6, wherein at least a part of the sensing signal is used as a reference signal or a synchronization signal.

11. An apparatus for wireless communication comprising at least one processor and a memory storing instructions, execution of which by the at least one processor causes the apparatus to:

transmit a sensing signal with a frequency that is a continuous function of time over a period of time in a range of [−B/2, B/2], wherein B is a transmission bandwidth of the sensing signal, wherein the frequency is linearly and continuously swept in the range of [−B/2, B/2].

12. The apparatus of claim 11, wherein the sensing signal is generated by at least one of:

(1) a time shift operation, (2) a frequency shift operation, (3) a mapping operation of a linear frequency modulation (LFM) signal, or (4) a mapping method related to a Zadoff-Chu sequence.

13. The apparatus of claim 11, wherein the sensing signal is generated by setting values of u and $C_v$ of a Zadoff-Chu (ZC) sequence, wherein u=1 or −1, wherein $C_v$=−M/2, −(M+1)/2, or −(M−1)/2, the ZC sequence represented by:

$$x_{u,v}(n) = x_u((n + C_v) \bmod M), \text{ and}$$

$$x_u(m) = e^{-j\frac{\pi u m(m+1)}{M}}, \; m = 0, 1, \ldots, M-1.$$

14. The apparatus of claim 11, wherein the sensing signal is generated using at least one of:

$$s(m) = \exp\left(j\pi\frac{(m - M/2)^2}{M}\right), \; m = 0, 1, 2, \ldots, M-1; \quad (1)$$

$$s(m) = \exp\left(j\pi\frac{m^2}{M} - j\pi m\right), \; m = 0, 1, 2, \ldots, M-1; \quad (2)$$

$$s(m) = \exp\left(-j\pi\frac{(m - M/2)^2}{M}\right), \; m = 0, 1, 2, \ldots, M-1; \text{ or} \quad (3)$$

$$s(m) = \exp\left(-j\pi\frac{m^2}{M} + j\pi m\right), \; m = 0, 1, 2, \ldots, M-1. \quad (4)$$

15. The apparatus of claim 11, wherein at least a part of the sensing signal is used as a reference signal or a synchronization signal.

16. An apparatus for wireless communication comprising at least one processor and a memory storing instructions, execution of which by the at least one processor causes the apparatus to:

receive a sensing signal with a frequency that is a continuous function of time over a period of time in a range of [−B/2, B/2], wherein B is a transmission bandwidth of the sensing signal, wherein the frequency is linearly and continuously swept in the range of [−B/2, B/2]; and conducting an operation based on the sensing signal.

17. The apparatus of claim 16, wherein the sensing signal is generated by at least one of:

(1) a time shift operation, (2) a frequency shift operation, (3) a mapping operation of a linear frequency modulation (LFM) signal, or (4) a mapping method related to a Zadoff-Chu sequence.

18. The apparatus of claim 16, wherein the sensing signal is generated by setting values of u and $C_v$ of a Zadoff-Chu (ZC) sequence, wherein u=1 or −1, wherein $C_v$=−M/2, −(M+1)/2, or −(M−1)/2, the ZC sequence represented by:

$$x_{u,v}(n) = x_u((n + C_v) \bmod M), \text{ and}$$

$$x_u(m) = e^{-j\frac{\pi u m(m+1)}{M}}, \; m = 0, 1, \ldots, M-1.$$

19. The apparatus of claim 16, wherein the sensing signal is generated using at least one of:

$$s(m) = \exp\left(j\pi\frac{(m - M/2)^2}{M}\right), \; m = 0, 1, 2, \ldots, M-1; \quad (1)$$

$$s(m) = \exp\left(j\pi\frac{m^2}{M} - j\pi m\right), \; m = 0, 1, 2, \ldots, M-1; \quad (2)$$

$$s(m) = \exp\left(-j\pi\frac{(m - M/2)^2}{M}\right), \; m = 0, 1, 2, \ldots, M-1; \text{ or} \quad (3)$$

$$s(m) = \exp\left(-j\pi\frac{m^2}{M} + j\pi m\right), \; m = 0, 1, 2, \ldots, M-1. \quad (4)$$

20. The apparatus of claim 16, wherein at least a part of the sensing signal is used as a reference signal or a synchronization signal.

* * * * *